(12) United States Patent
Lindén

(10) Patent No.: US 6,724,746 B1
(45) Date of Patent: Apr. 20, 2004

(54) PACKET COMMUNICATION SYSTEM AND A METHOD RELATED TO SUCH A SYSTEM

(75) Inventor: Lars Lindén, Hästveda (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/523,202

(22) Filed: Mar. 10, 2000

(30) Foreign Application Priority Data

Dec. 3, 1999 (SE) ................................................ 9900897

(51) Int. Cl.[7] .................................................. H04J 3/24
(52) U.S. Cl. ........................ 370/349; 370/458; 370/493
(58) Field of Search ................................. 370/328, 329, 370/338, 343, 344, 345, 347, 349, 352, 353, 356, 458, 480, 493, 494, 495, 496, 468; 455/550, 556, 557

(56) References Cited

U.S. PATENT DOCUMENTS

| | | | |
|---|---|---|---|
| 4,538,259 A | | 8/1985 | Moore |
| 5,313,454 A | | 5/1994 | Bustini et al. |
| 5,533,019 A | * | 7/1996 | Jayapalan .................... 370/352 |
| 5,742,592 A | * | 4/1998 | Scholefield et al. ......... 370/329 |
| 5,752,193 A | * | 5/1998 | Scholefield et al. ...... 455/452.2 |
| 5,901,142 A | * | 5/1999 | Averbuch et al. ........... 370/329 |
| 6,167,040 A | * | 12/2000 | Haeggstrom ................ 370/352 |
| 6,229,795 B1 | * | 5/2001 | Pankaj et al. ............... 370/329 |
| 6,330,451 B1 | * | 12/2001 | Sen et al. ................. 455/452.2 |
| 6,442,401 B1 | * | 8/2002 | Behan ....................... 455/552.1 |
| 6,466,552 B1 | * | 10/2002 | Haumont .................... 370/310 |
| 6,477,151 B1 | * | 11/2002 | Oksala ....................... 370/314 |
| 6,563,825 B1 | * | 5/2003 | Kari ........................... 370/394 |
| 6,567,388 B1 | * | 5/2003 | Tomcik et al. .............. 370/335 |
| 6,570,871 B1 | * | 5/2003 | Schneider ................... 370/356 |

FOREIGN PATENT DOCUMENTS

| | | |
|---|---|---|
| WO | 95/12265 | 5/1995 |
| WO | 97/36405 | 10/1997 |
| WO | 97/48251 | 12/1997 |

* cited by examiner

*Primary Examiner*—Kenneth Vanderpuye
*Assistant Examiner*—Bob A. Phunkulh

(57) ABSTRACT

The present invention relates to a packet data communication system and is primarily intended for packet data radio communication systems, such as a GSM-system (PLMN) supporting a GPRS-service. A data frame received from a connected second packet data network (Internet) is divided into a sequence of data segments (DS). Speech packets (SPP) with an origin from a connected telecommunication network and the segments (DS) and are transmitted over a packet data link (PL1) to a radio base station (BTS) with priority given to the speech packets (SPP). The data segments (DS) shall be transmitted on a corresponding radio link (RL2) to a designated mobile station (MS). The problem is that during high traffic loads the segments are subjected to long delays and as a result no segments can be transmitted on the corresponding radio link. Giving priority to a first few data segments of the sequence when transmitted over the packet data link (PL1) solves the problem.

24 Claims, 2 Drawing Sheets

PACKET COMMUNICATION SYSTEM AND A METHOD RELATED TO SUCH A SYSTEM

This application claims priority under 35 U.S.C. §§119 and/or 365 to 9900897-1 filed in Sweden on Mar. 12, 1999; the entire content of which is hereby incorporated by reference.

TECHNICAL FIELD OF THE INVENTION

The present invention relates to a packet data communication system which is connected to a telecommunication system and to another packet data communication system, and which gives transmission priority with respect to short delays for information packets received from the telecommunication network.

DESCRIPTION OF RELATED ART

In packet data transmission systems, the channels through the network share the capacity of the links within the system. This is in contrast to circuit switched communication systems where a corresponding link is dedicated to each transaction. The traffic generated in packet data systems is in the nature of bursts, i.e. traffic load varies, often rapidly, in time. The transmission delay of the packets will depend on the traffic load in the system and will thus also vary, often rapidly, in time. For a specific link, the transmission delay will depend on the number y of packets in line for transmission over the link. Packet losses may occur if transmission delays are too prolonged.

Telecom applications using packet transmission can be divided roughly into speech and data. In this case by "speech" is meant spoken information between two end users in a dialog. Speech applications usually use circuit switched telecommunication systems for transmission, since these systems are developed to fulfil the stringent requirements on short delays. Nevertheless, packet data systems are expected to transfer more of the speech in the future. However, data is the major application for packet data networks at the present time. To compete with the telecommunication system on the transmission of speech, packet transmission systems must keep delays short.

Generally the demand for short delay is not as critical for data as for speech. Data, however, is more vulnerable to loss of data packets.

It has been suggested that Internet should support differentiated Quality of Service for separate services. This would result in speech transmission being given priority with respect to delay over the transmission of data when speech and data compete for common transmission resources. These discussions have been held within a group IETF (Internet Engenering Task Force).

A granted patent U.S. Pat. No. 4,538,259 is related to a communication system transmitting voice packets. The voice packets are transmitted through the network to a receiving node where they are reproduced into sound. To reproduce the sound the digitised voice packets have to be D/A converted at a certain rate. One problem is that variations in transmission delays cause the voice packets to arrive at the receiving node at different intervals. To adjust for the variations in delay packets are intentionally delayed slightly in the receiving node before being reproduced into sound. The object of U.S. Pat. No. 4,538,259 is to define an adequate intentionally delay in the receiving node. If it is to too long, the quality of the connection is negatively effected as the total delay increases. Speech packets may also be lost due to overflow in the receiver buffer. If, on the other hand, the delay in the receiver is made too short it will not suffice to compensate for the variations in the transmission delay. To achieve the object according to U.S. Pat. No. 4,538,259 the first voice packet is sent with priority, thereby having a more defined transmission time through the communication system.

The present invention is more closely related to a packet data service designated General Packet Data Service, which is hereafter referred simply as GPRS. GPRS is to be a standardised service for mobile communication system GSM and work has been going on for some years to this end within the European standardisation organisation ETSI. A GSM network will have a connection to other packet data networks, for instance networks using TCP/IP protocols and will receive data packets in the form of data frames for further transmission to a receiving mobile station. The received data frames are however to large to fit into the protocol of the radio link and are therefore split into data segments before being transmitted to the mobile station.

According to one proposal there is included a packet control unit for receiving data frames and splitting each frame into a sequence of data segments. A packet data link is connected from the packet control unit to at least one radio base station. The radio base station is provided with a number of radio links for packet transmission to a number of mobile stations. A data frame addressed to a certain mobile station is thus split into a sequence of data segments in the packet control unit. The sequence is then transmitted over the packet data link to the radio base station. The sequence is interleaved over the packet data link with other sequences of data segments to be sent from the packet control unit to the radio base station, i.e. segments of different sequences are mixed in the transmission flow. Segments received in the radio base station are then sent over the radio links. The radio channels are a scarce resource and there is a need to utilise them efficiently. The lower limit of the transmission delay within the GSM system is determined by the capacity of the radio link.

The architecture of a GSM-system supporting the GPRS service has not yet been settled.

It has recently been disclosed that also American operators intend to introduce the GPRS-service in the AMPS and IS-136 mobile radio systems.

SUMMARY OF THE INVENTION

The present invention addresses a problem of efficiently transmitting data segments over a first packet data link to be received in a first node in time for the first node to transmit the segments at predefined times over a second packet data link, when the first packet data link is also used for transmission of information packets having priority over the data segments and when the transmitted capacity of the first packet data link is limited.

The problem relates for example to a GSM-system that uses packet transmission between internal nodes, to provide for both a traditional circuit connected speech service and for packet data service handling applications such as Internet data services. The packet data service shall enable data frames to be received from a data network such as Internet and be transmitted to a designated mobile station. The traditional connected speech service shall provide for communications between a PCM coded link, i.e. a link traditionally used for a circuit switched connection, and a mobile station.

A data frame is received by a GSM network and divided into a sequence of data segments in the packet control unit such as to fit into the protocol of the radio link. PCM coded information, i.e. mainly speech, is continuously received by the GSM network and continuously coded into information packets, in the case of speech this is effected by speech transcoders. According to the example, the architecture of the GSM-system enables the data segments and the information packets to be transmitted to a radio base station on the same first packet data link, i.e. to the first node. On the first packet data link the flow of data segments and information packets compete for transmission capacity.

Information packets are given priority over data segments when transmitted over the first packet data link.

However, data segments also have to be delivered to the base station on time for transmission to the mobile station. When priority is given to the information packets there is a risk that no data segments will arrive at the base station at the times for transmission over the radio link.

The data segments corresponding to a sequence are consecutively transmitted over the radio link, i.e. a second packet data link, to the mobile station. The time for transmission of the segments is determined by the mapping of logical channels on the radio link, the synchronisation of the mobile stations and also on the need to utilise effectively the scarce resource of the radio link.

The present invention solves the problem, by a method in which the first data segments of a sequence derived from one data frame are transmitted over the first packet data link with the same priority as the information packets, thereby reducing the risk of the first data segments arriving too late at the first node. Instead, some of the first data segments probably arrive too early and are buffered until time for transmission over the second link. A subsequent transmitted data segment may thereafter be subjected to a longer delay than would otherwise be possible without causing a problem, due to the presence of a data segment that has already arrived in the first node and that is ready for transmission over the second data packet link at the predefined time.

The problem is also solved by a packet communication system comprising an interface with means to transform a received stream of information into a corresponding stream of information packets. The system also comprises a packet control unit for receiving a data frame, a first nod, a first packet data link connecting the interface and the packet control unit to the first nod. The packet control unit includes means for splitting a received data frame into a sequence of data segments. The packet communication system also comprises means for transmitting said stream of information packets and said sequence of data segments over the first packet data link with priority given to information packets and to some first data segments in the sequence of data segments.

The problem is also solved by a method in which data segments and information packets are transmitted over a first packet data link to a first node. Information packets are given priority on the first packet data link. Data segments received by the first node are each to be transmitted at a predefined time over a second packet data link. Data segments are buffered in the first node until the predefined times for transmission over the second packet data link. In the event of the number of data segments decreasing a threshold number, the first node sends a signal. In response to the signal some few data segments are sent with priority over the first packet data link. Thereby, filling of the buffer is speeded up.

According to one embodiment of the invention, the packet data system is a radio communication network with a PCM coded connection to the telecommunication network and a connection to a packet data network. Data frames received from the data network are divided into sequences of data segments. A stream of information received by the PCM coded connection is transformed into a corresponding stream of information packets. The data segments and the stream of information packets are transmitted over the first link to the radio base station, with priority given to the information packets and the first data segments of a sequence. Sequences of data segments and information packets are transmitted from the radio base station to a mobile station on separate packet data radio links.

An advantage with the present invention is that the risk of no data segment being available in the first node at the predefined time for transmission over the second packet data link is markedly reduced, just by giving the first few data segments of the sequence a higher priority.

Further advantages afforded by the invention will be apparent from the following analysis of a packet data radio communication system. There is a fundamental difference in transmission of a data frame received by a packet data network and a stream of information received by a telecommunication network. The data frame is divided into segments, that are transmitted to the first node and then to the mobile station. The data frame is not restored until all segments of the frame have been received in the mobile station, wherewith the information carried thereby can be retrieved. This implies that an inevitable delay is introduced to the data frame when received at the mobile station. The lenght of the delay is dependent on the capacity of the radio link for all the segments to be transmitted.

Speech packets and data segments are transmitted over separate radio links. Data segments are transmitted over the radio link in a consecutive order at defined times.

The fact that all data segments of the sequence are available in the packet control unit means that data segments can be sent in advance over the first packet data link and buffered in the radio base station until time for transmission on the radio link. As distinct from data segments, information packets may not be delayed in the radio base station. Any delay of information packets in the radio base station will have an affect on the total transmission delay.

The advantages afforded by the present invention will be fully apparent in the light of the above analysis. The main advantage resides in less danger of the first node, e.g. the radio base station, being devoid of data segments at the time for transmission over the second link, e.g. the radio link. If it were not for the invention, the risk of running out of segments would be greatest at the beginning of transmission of the sequence of segments, since no or only some segments are then are buffered in the first node. The risk of the radio base station running out of segments for transmission could, in theory, be reduced by increasing the traffic capacity of the first packet data link. However, to achieve the same risk reduction, the capacity of the first link would have to be greatly increased, at a corresponding cost. The solution according to the present invention is much cheaper to implement. The invention is easy to implement. In a system supporting differentiated Quality of Service the nodes already handles priorities and the invention can be implemented merely by adding priority information to some data segments.

DESCRIPTION OF PREFERRED EMBODIMENTS

Figure 1:
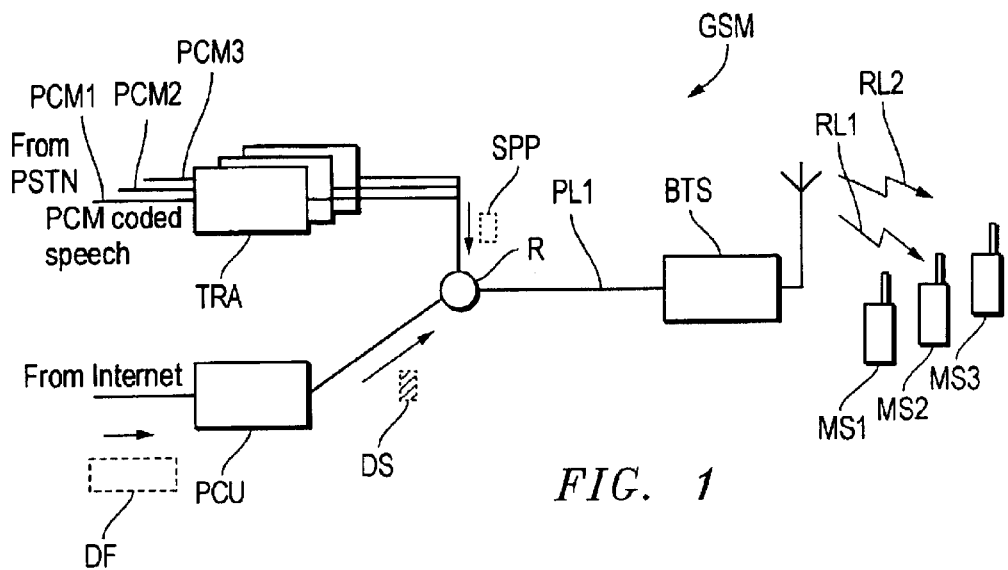
FIG. 1 is a block diagram of nodes in a GSM-system.

FIG. 1 shows nodes according to one architecture of a GSM-system PLMN supporting the GPRS-service while also supporting for traditional circuit switched connections. The GSM-system PLMN thus supplies for packet data communication services between mobile stations and nodes in a packet data communication network e.g. Internet and for speech connections between mobile stations and terminals within a telecommunication network.

The GSM-system PLMN in FIG. 1 uses packet transmission between internal nodes and is thus a packet data radio network. It comprises at least one radio base station BTS that serves a number of mobile stations MS1–MS3 with communication services. Radio communication systems generally comprise a number of radio base stations BTS, although only one has been shown in FIG. 1 for the sake of simplicity. The radio base station BTS is provided with a number of packet data radio links RL1–RL2 for communication with the mobile stations MS1–MS3.

The GSM-system PLMN is connected to a public telecommunication network PSTN by a PCM interface and is provided with a number of transcoders TRA for handling information from the telecommunication network PSTN, wherein each transcoder functions to handle an incoming PCM-coded speech connection from the telecommunication network PSTN. The GSM-system PLMN is connected to a public packet data network IP by a packet control unit PCU. Speech received by the transcoders TRA and data received by the packet control unit PCU are to be transmitted to the designated mobile stations MS1–MS3. In the case of the present invention only downlink transmission is relevant. However, in practice the systems supports transmission in both directions.

The transcoders TRA and the packet control unit PCU have links to a router R. The router R is connected to the radio base station BTS by a first packet data link PL1. The router R and the first packet data link PL1 provide for the transmission of speech and data to the radio base station BTS. Speech and data are transmitted from the radio base station BTS to the designated mobile station MS1 on separate radio links RL1–RL2.

Each transcoder TRA handles speech on an incoming PCM coded link PCM1–PCM3. It receives 8 bit samples of speech at 8 kHz frequency, transcodes the speech to reduce its redundancy, forms it into information packets SPP and sends the information packets SPP to the radio base station BTS. Each information packet SPP corresponds to a burst sent over the radio link RL1–RL2. The information content of the information packets is mainly speech, but can also be of other types of information. For this reason the word information packets SPP is used instead of speech packets.

The transcoder stops sending packets to the radio base station during moments of silence in the received speech.

Figure 2:
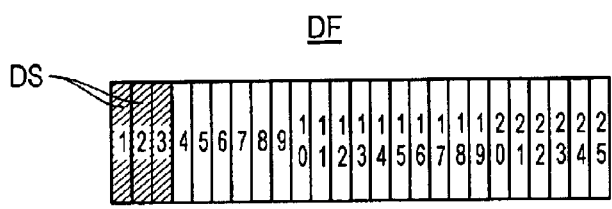
FIG. 2 is a block diagram illustrating a data frame split into a sequence of data segments.

The packet control unit PCU receives frames of data from the packet data network IP. One data frame DF is shown in FIG. 2. This data frame DF is much too large for the whole of said frame to be transmitted to the designated mobile station MS1. The frame is therefore divided into a sequence of data segments DS, each of which corresponds to a burst on the radio link RL2. The data frame DF is divided by the packet control unit PCU.

The resultant sequence of data segments shall be sent to a designated mobile station MS1. The data segments DS are transmitted in consecutive order on the radio link RL2. The information contained in the data frame DF cannot be retrieved in the mobile station MS1 until the whole sequence has been received. This implies that there is an inevitable delay in the transmission of the data frame DF, the duration of said delay being determined by the transmission capacity of the radio link RL2. However, delays also occur on the first packet data link PL1 and affect the transmission delay within the GSM-system PLMN. Although it is essential to reduce the delay, radio transmission capacity is a scarce commodity and therefore delays on wired links should be avoided.

However, the quality of speech is much more vulnerable to delays than the quality of received data. The GSM-system PLMN therefore gives priority to the transfer of information packets SPP. It is important also for the radio base station BTS to receive data segments DS corresponding to one PCM link at a defined rate, for the packet synchronisation.

On the first packet data link PL1 streams of information packets SPP corresponding to PCM links as well as data segments DS corresponding to a number of received data frames DF are transmitted in parallel. More specifically, data segments DS and information packets SPP of separate streams are interleaved when transmitted over the first packet data link PL1.

The traffic load on the first packet data link LP1 has a "bursty" character and since the information packets SPP are prioritised over data segments DS, the delay on the first link PL1 varies momentarily. At normal and medium high traffic load on the first packet data link PL1, the transmission capacity is still greater than over the radio link RL1 for a specific sequence. The delay is thus higher on the radio link RL1 then on the first packet data link PL1. Data segments DS are then buffered in the radio base station BTS until it is time for said segments to be transmitted over the radio link RL1.

The transmission times of the data segments DS from the radio base station BTS are fixed by the radio protocols that maps logical channels onto physical channels. To be able to transmit at the transmission times there shall be at least one data segment DS at respective transmission times received by the radio base station BTS. When there are no data segments DS, or only a few data segments DS, stored in the buffer, long delays over the first packet data link PL1 become critical as the radio base station BTS runs out of data segments DS at designated transmission times.

The invention and the result obtained therewith will now be described with reference to FIG. 3. The invention can be described very briefly by saying that the first data segments DS in a sequence are transmitted with priority on the first packet data link PL1, thereby reducing the risk of the radio base station BTS running out of data segments DS at designated transmission times.

Figure 3:
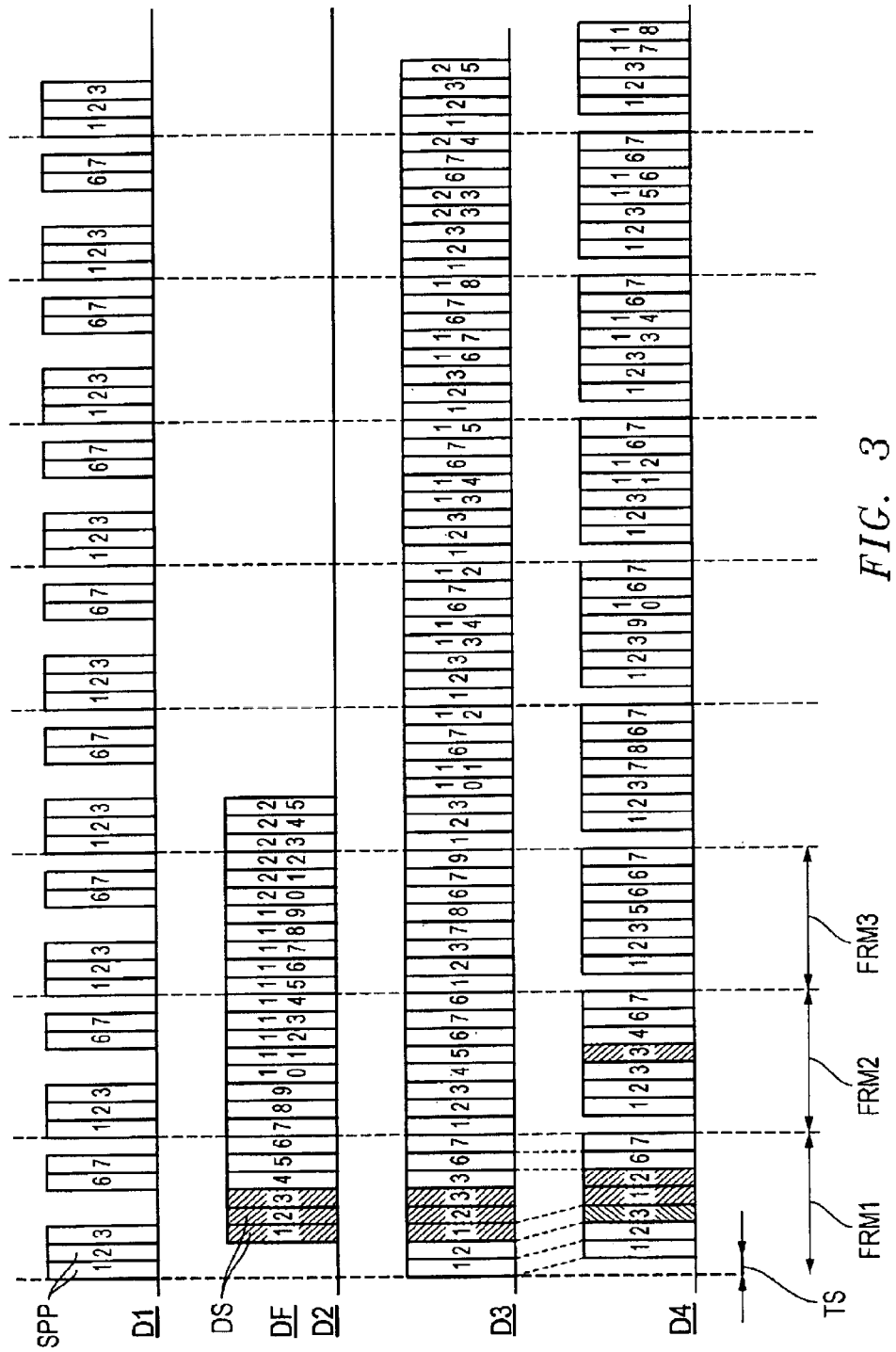
FIG. 3 is a scheme illustrating data segments and information packets sent over separate links.

Shown in FIG. 3 are four horizontal diagrams D1–D4, each of which comprises a number of boxes spread along a vertical line. Each diagram D1–D4 corresponds to a link PL1, RL1, RL2, and the boxes represent information packets SPP or data segments DS. A vertical line along the diagrams represents time. A number of vertical striped lines cross the horizontal lines. The distance between the striped lines corresponds to time for eight time slots, each of which conveys a corresponding information packet SPP or a data segment DS. As described above a information packet SPP as well as a data segment DS corresponds to a burst transmitted on the radio link RL1. Eight consecutive time slots are defined as being a frame FRM1–FRM3 on the physical layer of the radio protocol.

So that the result of the invention will be more readily understood, only two streams of information are shown in FIG. 3. One of the streams derives from PCM-coded speech connections. The first diagram D1 illustrates the input of information packets SPP to the router R from the transcoder TRA. The hollow boxes each represent a information packet SPP in the stream. The stream of information packets SPP only uses five of the eight time slots in each frame FRM1–FRM3.

The other of the two streams corresponds to a sequence of data segments DS derived from one data frame DF. The second diagram D2 in FIG. 3 shows the sequence of data segments DS sent from the transcoder TRA to the router R. The data segments DS are shadowed so that they can be distinguished from the information packets SPP. The first three of the segments DS are shadowed to a darker extent for ease of recognition and contain information to the effect that they shall be given priority in transmission to the radio base station. As shown in FIG. 3 in diagram D3 the data segments DS are transmitted consecutively to the router R.

The router R receives the information packets SPP and data segments DS shown in diagrams D1 and D2 in FIG. 3 on parallel input links. Similar to the first three data segments DS the information packets SPP contain information to the effect that they shall be prioritised. At the third time slot in the first frame FRM1 the router R receives in parallel one information packet SPP and one data segment DS, both of which are to be handled with priority.

Diagram D3 represents the first packet data link PL1 and information packets SPP and data segments SD transmitted from the router R to the radio base station BTS on the link PL1. In the first two time slots of the first frame FRM1, the two speech segments SPP just received are transmitted to the radio base station BTS. For the third time slot both a data segment DS and a information packet SPP apply for transmission, both of which are to be prioritised. The router R selects one of these arbitrarily and in the illustrated case the first data segment DS is transmitted in the third time slot. In the next two time slots, the next two prioritised data segments DS are transmitted over the first packet data link PL1.

Subsequent time slots on the first packet data link PL1 are used for conveying information packets SPP whenever a information packet SPP has been received in the router R. Data segments DS are transmitted over the first packet data link PL1 in the remaining time slots. In diagram D3 in the second and subsequent frames FRM2, FRM3, five time slots are used for transmitting information packets SPP and the remaining three time slots are used for transmitting data segments DS over the first packet data link PL1.

The data segments DS and information packets SPP transmitted over the first packet data link PL1 are received by the radio base station BTS to be transmitted over separate packet data radio links RL1–RL2. In the GSM-system PLMN logical channels, i.e. links, are mapped on physical channels. In this example the same physical carrier is used for the two radio links RL1–RL2 carrying speech and data respectively. The two radio links RL1–RL2 are dedicated to separate time slots TM in the frames of the frequency carrier.

Diagram D4, in FIG. 3, represents the frequency carrier on which information packets SPP and data segments DS are transmitted on separate radio links RL1, RL2. A first of the radio links RL1, carrying information packets SPP, is formed by the second to fourth, seventh and eighth time slots in each frame FRM1–FRM3. The fifth and sixth time slots of each frame FRM1–FRM3 form the second of the radio links RL2, carrying data segments.

With respect to the first frame in diagram D4 and D3 it is shown that the first two information packets SPP received by the radio base station BTS are transmitted on the two first time slots belonging to the first radio link RL1. In the third time slot of the first radio link RL1, marked with a striped grey shadow, nothing is transmitted as there is no information packet SPP to be transmitted in the radio base station BTS. The next two time slots in diagram D4 correspond to the second radio link RL2 and are used for transmitting the two data segments DS first received by the radio base station BTS. One data segment DS, the last of the three received by the radio base station BTS in the first frame, is buffered in the radio base station BTS for transmission in the subsequent frame FRM2 over the second radio link RL2.

The last two time slots of the first frame FRM1 shown on diagram D4 in FIG. 3 belong to the first radio link RL1. On the first of these two time slots, the radio base station BTS transmits the information packet SPP received in the corresponding time slot of the first packet data link PL1, although a information packet SPP has already been received by the radio base station BTS in the preceding time slot. However, short delay is to be prioritised for information packets SPP and therefore the preceding information packet SPP is lost in favour of the last two information packets SPP of the frame FRM1 to be transmitted to the designated mobile station MS1.

By priority has hitherto been meant priority with respect to short delay. In the following description, however, it is necessary to distinguish between different qualities of service with separate priorities with respect to short delay and packet losses. For information packets SPP the given priority with respect to short delay is high, but low with respect to packet loss. Whereas for data segments DS the given priority with respect loss is high and for the first three segments DS of the sequence, priority is also high with respect to short delay for transmission to the radio base station BTS.

Diagram D4 of FIG. 3 corresponds to one frequency carrier. However the principle of defined transmission times on the separate radio links RL1–RL2 applies also if the links are mapped on different frequency carriers. The mapping of logical channels on physical channels is more complicated than that shown in FIG. 3, line 4, although the invention can nevertheless be applied as shown in FIG. 3. In a real system the traffic load on the first packet data link PL1 would vary between different frames FRM1–FRM3.

During transmission of the sequence of data segments DS there is a danger of the number of data segments DS in the buffer in the radio base station BTS decreasing to just a few segments or to no segments at all if delays on the first packet data link PL1 become too prolonged. To counteract this danger, it is proposed in accordance with one embodiment of the invention that a control channel is provided from the radio base station BTS to the packet control unit PCU. When the number of data segments in the buffer decreases below a given threshold limit, the radio base station BTS sends a signal to the packet control unit PCU to this effect. The packet control unit PCU then sends a few data segments DS that are given a short delay priority. This accelerates filling of data segments DS in the buffer. The embodiment is optionally combined with sequence numbering of the data segments DS. Without sequence numbering a sudden increase in priority can cause high priority segments DS to arrive before previously sent low priority segments DS.

The number of segments DS to which priority is given shall be chosen with respect to the capacity of the radio link RL1, the delay on the first packet data link PL1 and also with respect to variations in the delay. An adequate number can be expected to be in the range from three up to eight for a system that has eight time slots per frame FRM1–FRM3.

As will be evident from FIG. 3, in addition to the first reason for dividing the received data frame DF into a sequence of data segments DS, namely because frame is too large to be transmitted on the radio link, there is also a second reason why this should be done. This second reason is because information packets SPP would otherwise be subjected to a long delay on the first packet data link PL1 if the whole data frame DF were to be transmitted on the first packet data link PL1.

It has been said in the aforegoing that speech is received by the GSM-system PLMN on the PCM-link, i.e. the interface towards the telecommunication network PSTN. Although speech is the most common information transmitted on PCM-links other types of information are also transmitted, e.g. facsimile messages and data between computers. These other types of information are transmitted the same way as speech information within the GSM-network, although the transcoding, i.e. the reduction of information redundancy, is omitted.

The architecture of the GSM-system PLMN supporting the GPRS-service shown in FIG. 1 is presently not publicly disclosed. It has an advantage compared to other architectures for the GPRS-service in that the first packet data link PL1 is commonly used both for transmissions of data segments DS and for speech packets SPP. Thereby truncation gains are obtained compared to using separate links.

The invention can be implemented also in wired packet data communication systems, for instance to transmit information between separate telecommunications networks in packets while also transmitting "traditional" packet data.

What is claimed is:

1. A method relating to a packet data communication system to improve the transmission efficiency when transmitting information packets, which are sensitive to delay and data segments, which are sensitive to loss of data, the method comprising the steps of:
   receiving information packets from a first communications network;
   receiving a data frame from a second communications network;
   dividing said data frame into a sequence of data segments;
   transmitting said sequence of data segments over a first packet data link with a second priority to a first node for further transmission over a second packet data link, wherein information packets are also transmitted over the first packet data link with a first priority and wherein said sequence of data segments and said information packets share transmission resources on said first packet data link on a time multiplexed basis while performing said step of transmitting; and
   wherein while transmitting said sequence of data segments, transmitting some of the first data segments of said sequence of data segments with said first priority over said first packet data link.

2. A method according to claim 1, wherein the data segments of said sequence of data segments are to be transmitted over said second packet data link at defined times.

3. A method according to claim 2, wherein said first node is a radio base station and said second packet data link is a packet data radio link.

4. A method according to claim 1, wherein in general the capacity for transmitting said sequence of data segments is higher on said first packet data link than on said second packet data link.

5. A method according to claim 1, wherein said information packets are packets of sampled, digitized speech.

6. A method according to claim 1, wherein the number of said sequence data segments in said sequence of data segments is in the order of three to eight.

7. A method according to claim 3, wherein the packet data communication system is a radio communication system.

8. A method according to claim 7, wherein the packet data communication system is a GSM-system.

9. A method according to claim 1, wherein said first priority is a priority with respect to delay, and wherein the data segments are given a second priority with respect to low packet loss.

10. A method according to claim 1, wherein received data segments are buffered in said first node until transmission on said second packet data link is effected, and wherein in the event of the buffered number of data segments decreasing to below a threshold value, said first node sends a signal to a packet control unit and the packet control unit therewith gives priority to some data segments at transmission.

11. A packet communication system comprising:
   a first interface for receiving a stream of information from a first communications network and transforming said stream of information into a corresponding stream of information packets,
   a packet control unit that has a second interface for receiving a data frame from a second communications network and for segmenting said data frame into a sequence of data segments,
   a first node,
   a first packet data link connecting said first interface and said packet control unit to said first node,
   means for transmitting said stream of information packets and said sequence of data segments on said first packet data link with a first priority given to a first few of the data segments of said sequence of data segments and to all of the information packets of said stream of information packets wherein a second priority is given to a rest of the data segments of said sequence of data segments; and
   wherein said means for transmitting shares transmission resources on said first packet data link by transmitting said stream of information packets and said sequence of data segments on a time multiplexed basis.

12. A packet communication system according to claim 11, wherein the received stream of information corresponds to speech and said first interface comprises a speech transcoder.

13. A packet communication system according to claim 11, wherein said first node comprises a buffer for buffering received data segments until predefined times for further transmission are reached.

14. A packet communication system according to claim 11, wherein said first priority is a short delay priority.

15. A packet communication system according to claim 13, further comprising:
   a control link from said first node to said packet control unit,
   means in said first node for sending a signal to said packet control unit in the event of the number of data segments in said buffer falling below a given threshold value, and
   means in said packet control unit for giving some few data segments transmission priority in response to said signal.

16. A packet communication system according to claim 11, further comprising:

a router that connects said first interface and said packet control unit to said first packet data link.

17. A packet communication system according to claim 11, wherein said first node is a radio base station having a second and a third packet data radio link for transmitting data segments and information packets respectively.

18. A packet communication system according to claim 11, wherein said first interface is towards a telecommunication system and said packet control unit is towards a second packet data network.

19. A method relating to a packet data communication system to improve the transmission efficiency when transmitting information packets, which are sensitive to delay and data segments, which are sensitive to loss of data, the method comprising the steps of:

receiving a data frame;

dividing said data frame into a sequence of data segments;

transmitting said sequence of data segments over a first packet data link to a first node for further transmission over a second packet data link, wherein information packets are also transmitted over the first packet data link with a first priority;

buffering the received data segments in said first node until transmission over a second packet data link at defined times for each data segment; and signaling from said first node in the event of the number of data segments decreases a threshold number whereupon a few of the data segments of said sequence of data segments are transmitted with said first priority over said first packet data link.

20. A method according to claim 19, wherein said first node is a radio base station and said second packet data link is a packet data radio link.

21. A method according to claim 19, wherein in general the capacity for transmitting the data segments is higher on said first packet data link than on said second packet data link.

22. A method according to claim 19, wherein said information packets are packets of sampled, digitized speech.

23. A method according to claim 19, wherein the number of said few data segments In said sequence of data segments is in the order of three to eight.

24. A method according to claim 19, wherein said first priority is a priority with respect to delay, and wherein the data segments are given a second priority with respect to low packet loss.

* * * * *